United States Patent [19]

Neumann et al.

[11] Patent Number: 5,016,197

[45] Date of Patent: May 14, 1991

[54] AUTOMATED TRASH MANAGEMENT SYSTEM

[75] Inventors: Rodney H. Neumann; Charles B. Allison, both of Houston, Tex.

[73] Assignee: MGM Services, Inc., Houston, Tex.

[21] Appl. No.: 532,359

[22] Filed: Jun. 1, 1990

Related U.S. Application Data

[63] Continuation of Ser. No. 257,422, Oct. 13, 1988, abandoned, which is a continuation-in-part of Ser. No. 228,384, Aug. 4, 1988, abandoned, which is a continuation of Ser. No. 876,066, Jun. 17, 1986, Pat. No. 4,773,027.

[51] Int. Cl.$^5$ .................. G06F 15/46; B30B 15/26
[52] U.S. Cl. ........................ 364/550; 364/558;
364/567; 100/229 A; 100/50; 100/99;
414/525.2; 414/517; 414/541; 414/549
[58] Field of Search .......... 364/550, 551.01, 558,
364/505, 567, 478; 53/527, 529; 73/818, 820,
825; 100/35, 41, 43, 45, 49-53, 99, 226, 229 R,
229 A; 414/525.2, 528.55, 517, 549, 541

[56] References Cited

U.S. PATENT DOCUMENTS

| | | | |
|---|---|---|---|
| 3,534,678 | 10/1970 | Clar ........................................ | 100/50 |
| 3,636,863 | 1/1972 | Woyden ................................. | 100/49 |
| 3,765,147 | 10/1973 | Ippolito et al. ....................... | 100/49 |
| 3,918,359 | 11/1975 | Hennells et al. ..................... | 100/99 |
| 4,068,096 | 1/1978 | Rattenborg et al. ................ | 179/2 A |
| 4,073,228 | 2/1978 | Hemzl ..................................... | 100/99 |
| 4,100,849 | 7/1978 | Pelton ...................................... | 100/41 |
| 4,116,050 | 9/1978 | Tanahashi et al. .................... | 100/99 |
| 4,147,893 | 4/1979 | Matson .................................... | 179/2 A |
| 4,234,926 | 11/1980 | Wallace et al. ................ | 364/551.01 |
| 4,274,282 | 6/1981 | Budraitis et al. ................. | 73/862.64 |
| 4,294,682 | 10/1981 | Deczky .................................... | 364/478 |
| 4,391,188 | 7/1983 | Gwathney et al. ............. | 100/229 A |
| 4,424,740 | 1/1984 | Gwathney et al. ................... | 100/52 |
| 4,643,087 | 2/1987 | Fenner et al. ........................ | 100/35 |
| 4,735,136 | 4/1988 | Lee et al. ................................ | 100/99 |

FOREIGN PATENT DOCUMENTS 2087791  6/1982  United Kingdom ........... 100/229 A

OTHER PUBLICATIONS

A brochure entitled "Computerized Waste Flow Control", Waste Management, Inc., Dec., 1985.

*Primary Examiner*—Parshotam S. Lall
*Assistant Examiner*—V. Trans
*Attorney, Agent, or Firm*—Dodge, Bush & Moseley

[57] ABSTRACT

An automated trash management system for remotely measuring the fullness of a plurality of trash containers is disclosed. Each container is provided with a remote sensing unit for generating a signal proportional to a characteristic of the container by which the extent of fullness of the container may be determined. A transmission linkage, typically a telephone line, is provided from each remote sensing unit to a central unit, where a data base of the signals transmitted from a particular trash container may be stored and analyzed. A hauler is called from the central unit location by a user after a determination from the data base that a particular trash container is in a condition of fullness warranting emptying. Several embodiments of the invention are disclosed in that for compactor equipped containers, the instantaneous pressure applied to the compression member of the compactor is monitored and processed either with limit switch data or without to determine a sequence of data signals indicative of the fullness of the container. In another pressure monitoring embodiment, the work of the compression member during a compaction stroke, is determined and analyzed as to the extent of fullness of the container. In another embodiment, current applied to the motor which drives the hydraulic pump of the compression member is monitored as a substitute for measuring pressure directly. In an embodiment of the invention applicable for non-compaction containers and compaction containers alike, a weight signal proportional to the weight of the container is compared to a predetermined weight signal for each container to determine its degree of fullness.

10 Claims, 10 Drawing Sheets

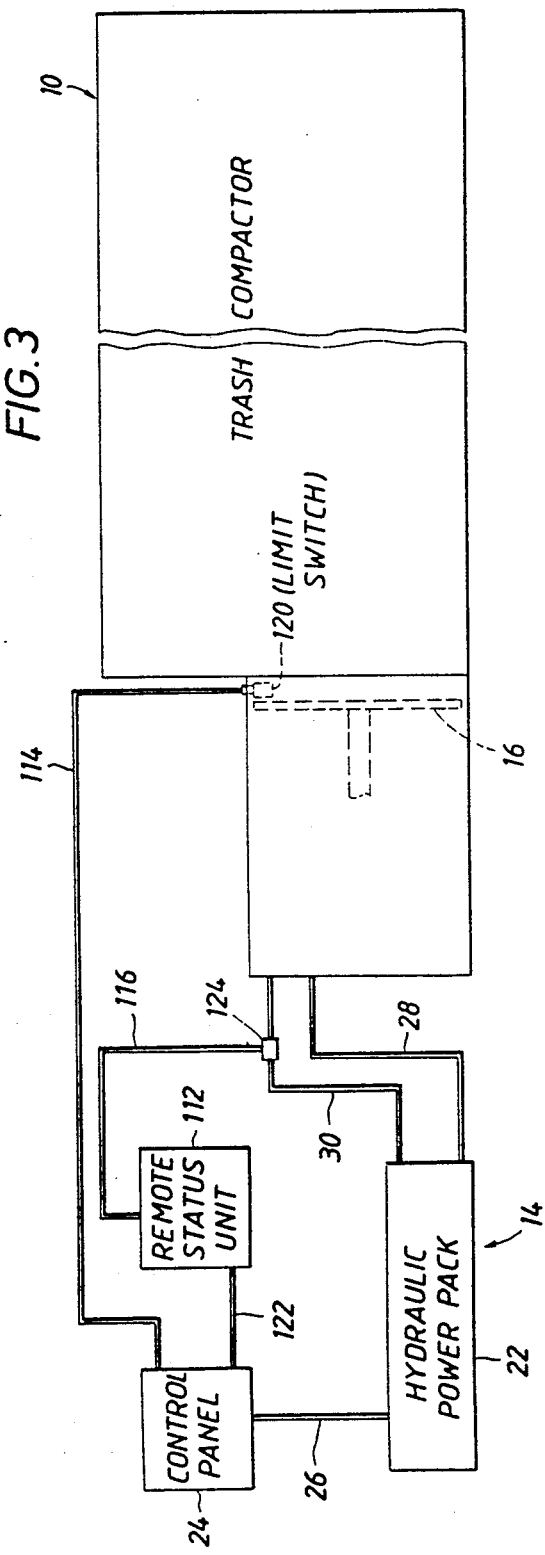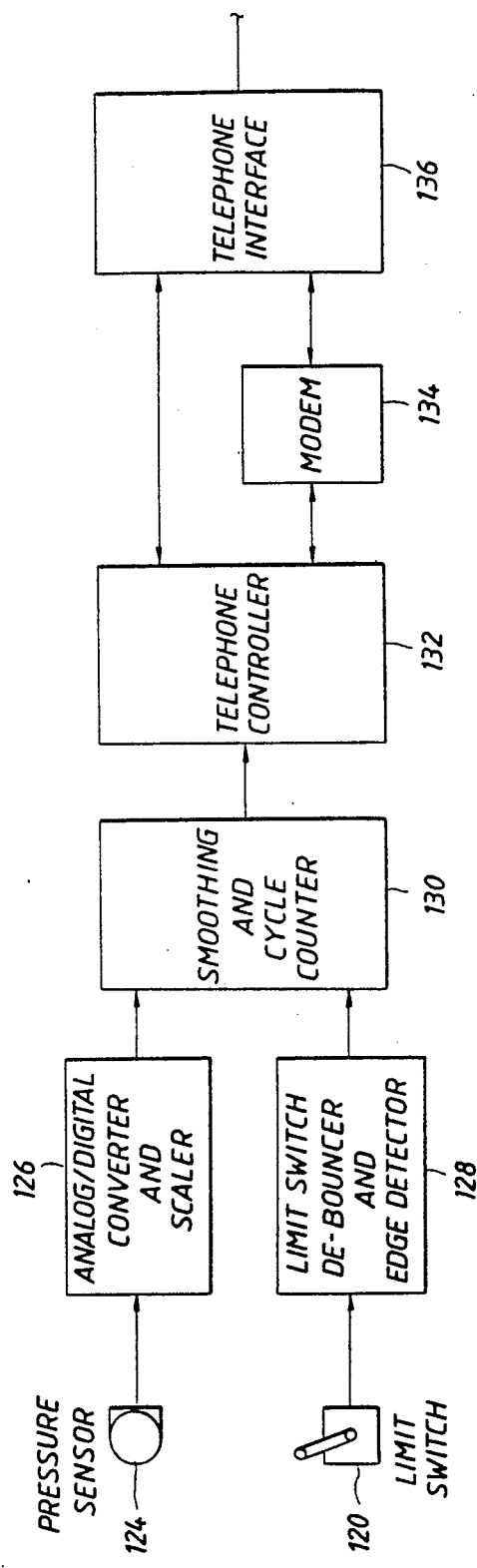

AUTOMATED TRASH MANAGEMENT SYSTEM

CROSS-REFERENCE TO RELATED APPLICATIONS

THis application is a continuation of application Ser. No. 257,422, filed 10/13/88, now abandoned, which is a Continuation-In-Part of Ser. No. 228,384 filed 8/4/88 (now abandoned) which is a Continuation-In-Part of Ser. No. 875,066 filed 6/17/86 now issued U.S. Pat. No. 4,773,027.

FIELD OF THE INVENTION

The present invention relates generally to the effective management of trash compactor/container units. More particularly, the present invention relates to an apparatus for monitoring, controlling and coordinating the hauling of a plurality of trash compactor/container units to provide that the units are emptied only when appropriately full.

BACKGROUND OF THE INVENTION

Due to the ever increasing volume, the effective disposal of trash has become extremely important socially and monetarily. It has become readily apparent that the demand for single use or "throw-away" items has greatly increased. The increased quantity of "throw-away" items and receptacles has created a great need for the effective disposal of trash.

Accordingly, it has become necessary to effectively dispose of great volumes of trash, especially in high population density areas. One of the primary mechanisms for disposing of high volumes of trash in high population density areas has been utilization of mobile trash containers. Mobile trash containers are placed adjacent homes, apartment complexes, businesses, factories, etc. The containers are filled by local users of disposable items. Typically, after a specified period of time, dependent on the local user, a hauler goes to each trash container and empties the trash or exchanges a full container for an empty container. The hauler takes the trash to a refuse center or land fill for a permanent disposal. Mobile trash containers have been a great advance in efficiently removing trash, especially in high population density areas.

In an attempt to improve mobile trash containers, trash compactor units have been used. Typically, the trash compactor units are either built into the container to be a part thereof or removably associated wit the container. The trash compactor unit helps to provide for the optimal use of the container. As the container is filled, the trash compactor acts to compress the trash in the container. Thus, the container can hold considerably more trash than if not compressed. The combination of the trash compactor and the trash container has been a substantial advancement in disposing of great volumes of trash.

Even with the use of the trash compactor/container units, it is still required to use a hauler to empty the containers. It can be appreciated that one of the largest expenses in maintaining an adequate trash removal system is the expense of the hauler. The hauling expense increases with the increase in the frequency of hauling containers. The hauling expense is greatly increased when containers are hauled that are less than full.

It is, therefore, a feature of the present invention to provide an automated trash management system to coordinate the hauling of a plurality of trash compactor/container units based upon their respective fullness or the anticipation of fullness to provide that the containers are emptied when appropriately full.

Another feature of the present invention is to provide an automated trash management system to monitor the fullness of a plurality of trash compactor/container units based upon an analysis of the number of cycles of the compactor and the pressure associated therewith.

Yet another feature of the present invention is to provide an automated trash management system which monitors the fullness of a plurality of trash compactor/container units based upon an analysis of the pressure associated with each compactor.

Still another feature of the present invention is to provide an automated trash management system to control the compression cycles of and the pressure exerted on trash in a plurality of trash compactor/container units.

Another feature of the present invention is to monitor the fullness of a single trash compactor/container unit based upon the number of cycles of the compactor and the pressure associated therewith.

Another feature of the present invention is to monitor the fullness of a single trash compactor/container unit based upon an analysis of the pressure associated with the compactor.

Additional features and advantages of the invention will be set forth in part in the description which follows, and in part will become apparent from the description, or may be learned by practice of the invention. The features and advantages of the invention may be realized and obtained by means of the instrumentalities and combinations particularly pointed out in the appended claims.

SUMMARY OF THE INVENTION

To achieve the foregoing features and advantages and in accordance with the purposes of the invention as embodied and broadly described herein, an automated trash management system is provided for measuring the fullness of a plurality of trash containers, each trash container having a packing system, and each packing system having a compression member for engaging and compacting the trash in the container, the automated trash management system comprising a plurality of remote status units each in association with a trash container comprising a sensing device for monitoring the pressure provided to the compression member by the compacting system and means for receiving the monitored pressure for determining the fullness of the trash container based upon the monotonically increasing portions of the monitored pressure, a central unit for receiving the container fullness calculations from each remote status unit and for compiling a data base of the fullness of each trash container, and a communications linkage for transferring the fullness calculations from the plurality of remote status units to the central unit such that the fullness of each trash container can be monitored at the single location of the central unit and, from the location of the central unit, authorization to the hauler to empty the trash containers can be restricted to only those containers which are approaching full thereby reducing the frequency of and the expense of hauling.

More particularly, the means for calculating the fullness utilized in the automated trash management system comprises a data analysis device for receiving the pressure provided to the compression member by the packing system from the sensing device for smoothing the received data to minimize the effects of material tumbling in the trash container for reducing fluctuations in the calculation of container fullness of each container and reducing the frequency of and the expense of hauling.

Another embodiment of the automated trash management system of the present invention measures the fullness of a trash container in operative association with a packing system having a compression member for engaging and compacting the trash in the container and having a limit switch activated by the compression member when fully extended, the automated trash management system comprising a sensing device for monitoring the pressure provided to the compression member by the packing system, means for receiving the pressure from the sensing device when the limit switch is activated by the compression member, and means for calculating the fullness of the trash container based upon the monotonically increasing portions of the monitored pressure.

In a more narrow sense, the automated trash management system of the present invention measures the fullness of a trash container associated with a packing system having a compression member for engaging and compacting the trash in the container comprising a limit switch activated by the compression member when fully extended by the packing system, a sensing device for monitoring the pressure provided by the packing system to the compression member, means for receiving the pressure from the sensing device when the limit switch is activated by the compression member, and means for calculating the fullness of the trash container based upon the monotonically increasing portions of the monitored pressure.

According to another embodiment of the invention, the sensing device for measuring hydraulic pressure to the compression member of the packing system is used to produce a pressure signal which is combined with compression stroke start and stop signals in a digital processor to determine the amount of work expended during each stroke to compress trash in the container. The work for each stroke is then accumulated for all compaction strokes after the container was last emptied. The accumulated total signal is compared with a predetermined work signal representative of a full container of like size and kind of trash deposited in such container. A container full signal or container not full signal is produced in each remote sensing unit which may be accessed from a central unit via modems and telephonic lines or other transmission media.

According to another embodiment of the invention, a current signal proportional to the current applied to the motor which drives a pump for applying pressure to the compression member during the compaction stroke is monitored and used as a substitute signal proportional to instantaneous compression member pressure in all the previously mentioned embodiments which use such pressure as a characteristic of the container for a fullness determination.

In still another embodiment of the invention, a weight signal is produced from a strain gauge disposed on a load cell on which the container is placed. Such embodiment applies not only to compactor/containers, but also to stand alone containers having no associated compaction equipment. A remote sensing unit accepts such weight signal and processes it to determine the weight of the trash in the container. The processed signal may be remotely commanded to be transmitted to a central unit where it may be compared with a predetermined signal to determine the extent of fullness of the container.

BRIEF DESCRIPTION OF THE DRAWINGS

The accompanying drawings, which are incorporated in and constitute a part of the specification, illustrate preferred embodiments of the invention and, together with the general description of the invention given above and the detailed description of the preferred embodiments given below, serve to explain the principles of the invention.

FIG. 3 depicts a schematic representation of the compactor/container unit illustrated in FIG. 2;

FIG. 4 is a block diagram illustrating the automated trash management system of the present invention for use with a compactor/container unit having a limit switch;

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENTS

Reference will now be made in detail to the present preferred embodiments of the invention as described in the accompanying drawings.

Figure 1:
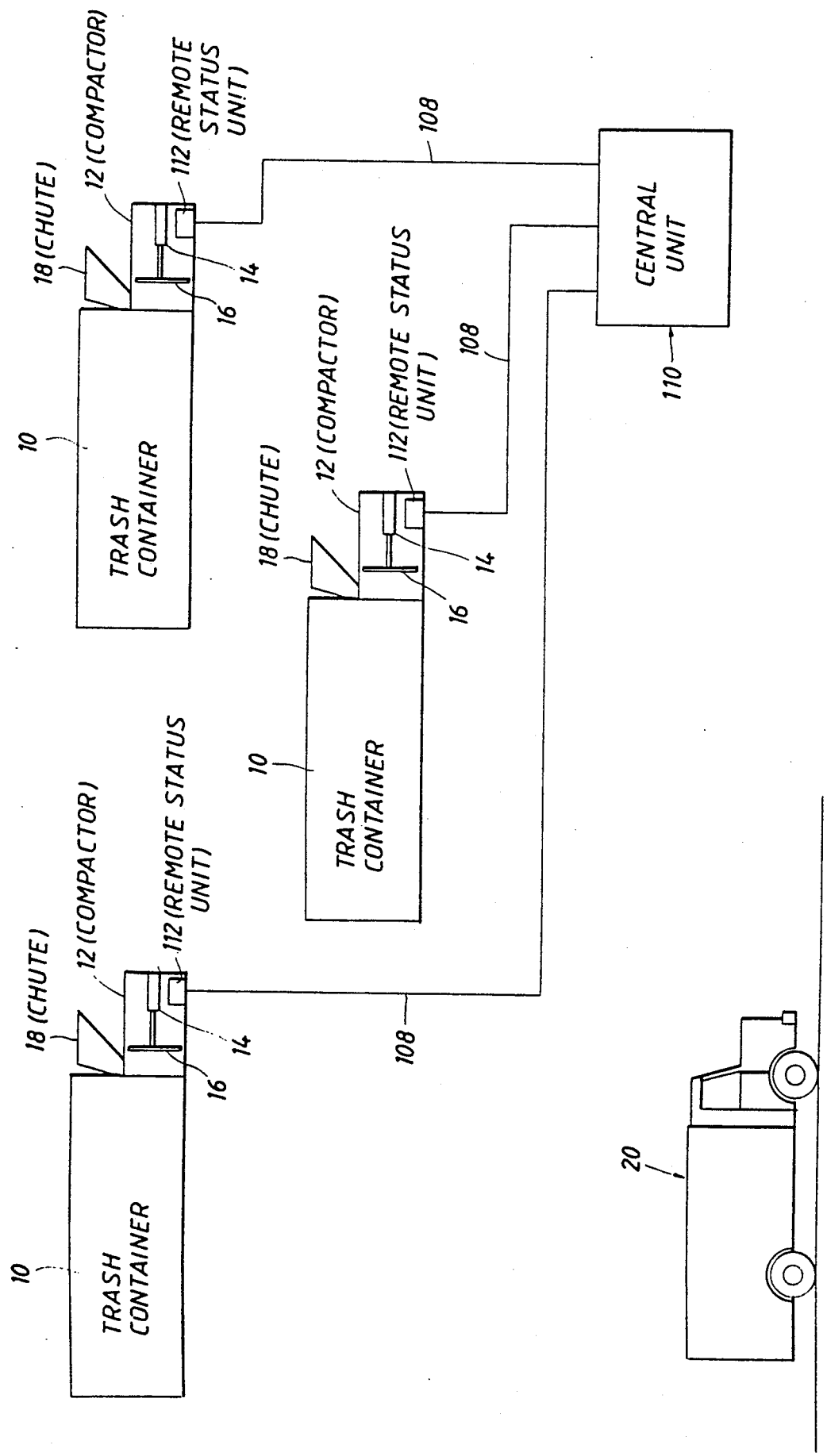
FIG. 1 depicts a schematic representation of an automated trash management system of the present invention.

FIG. 1 illustrates an automated trash management system of the present invention. The primary elements of the automated trash management system are the remote status units 112, the central unit 110 and the communication linkages 108. A remote status unit 112 is operatively associated with three different containers 10 and their associated compactors 12. Each of the remote status units 112 are connected to the central unit 110 by the communications linkage 108. The remote status unit 112 acquires information based upon the packing system 14 which is used to compact the trash in each container 10. Trash is inserted into the container 10 through the chute 18. The packing system 14 packs the trash inserted in the chute 18 using the compaction member 16. The remote status unit 112 acquires information about the packing of the trash in the container 10 and transmits this information to the central unit 110 through the communications linkage 108. The central unit 110 acquires the information from each remote status unit 112 to build a data base concerning the level of fullness of each container 10. The central unit 110 monitors the fullness of the containers 10 as the containers are filled with trash. The indication of fullness acquired from the central unit 110 is transferred to the hauler. The hauler sends a truck 20 to empty the containers 10 when appropriately full. Thus, the automated trash management system provides a mechanism by which a plurality of containers 10 can be independently monitored to provide disposal only when each individual container 10 is sufficiently full.

Figure 2:
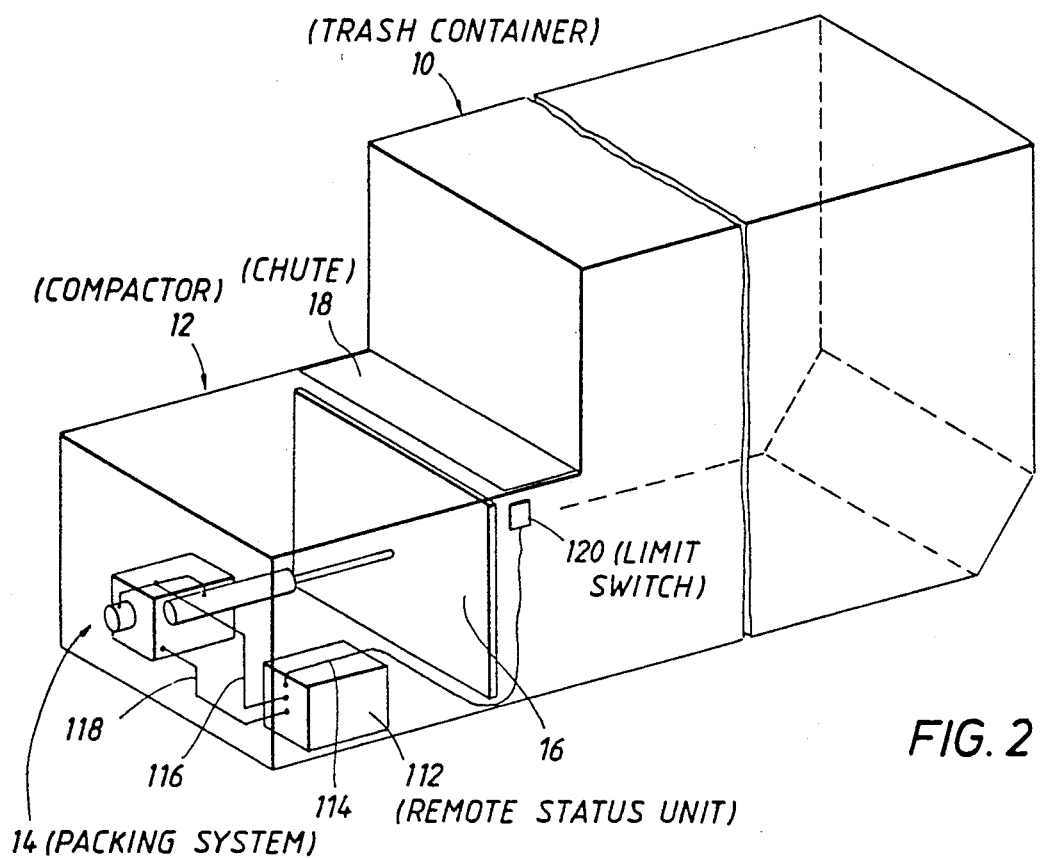
FIG. 2 illustrates a perspective view of a single compactor/container unit having a limit switch and adapted for use with the automated trash management system of the present invention.

Determination of container fullness using instantaneous pressure and limit switch FIG. 2 illustrates a perspective view of a single compactor/container unit adapted for use with the automated trash management system of the present invention. The compactor 12 is attached to the container 10. A chute 18 is oriented so that trash placed in the container 10 through the chute 18 can be engaged by the compactor 12. The remote status unit 112 acquires the appropriate information from the compactor 12. Primarily, the remote status unit 112 monitors the hydraulic drive pressure associated with the packing system 14. The remote status unit 112 is adaptable to connect to the power supply of the packing system 14. A power connector 118 is utilized by the remote status unit 112 to acquire power from the packing system 14. Likewise, information is acquired from the packing system 14 of the compactor 12 by similar connections. A limit switch connection 114 is utilized to acquire information about the placement of the compression member 16 and about the number of pack cycles of the compactor 12. A pressure connection 116 is connected to a hydraulic line which provides forward motive force from the packing system 14 to the compression member 16. The information acquired from the limit switch connection 114 and the pressure connection 116 are used in conjunction to count the pack cycles, determine the placement of the compression member 16 and measure the hydraulic drive pressure.

FIG. 2 illustrates the compression member 16 extended by the packing system 14 toward the limit switch 120. As the compression member 16 extends toward the container 10, the trash placed in the chute 18 is compressed. When the compression member 16 engages the limit switch 120, the packing system 14 stops applying pressure to the compression member 16. Typically, the compression member 16 is withdrawn by the packing system 14 and a duration of time passes prior to the compression member 16 being forced by the packing system 14 to again compress trash in the container 10. Alternatively, the compression member 16 can remain in a forward position rather than being withdrawn.

FIG. 3 depicts a schematic representation of the compactor/container unit illustrated in FIG. 2. The packing system 14, as illustrated in FIG. 3, is conventional and many different systems are well known. The packing system 14 as illustrated has five primary components. The components of the packing system 14 are a hydraulic power pack 22, a control panel 24, an electrical connection 26, a first hydraulic line 28 and a second hydraulic line 30. Power is supplied to the packing system 14 through the control panel 24. The control panel 24 provides power to drive the hydraulic power pack 22. The hydraulic power pack 22 drives the compression member 16 utilizing the hydraulic lines 28 and 30. Also, the control panel 24 monitors each cycle of the compression member 16 utilizing the limit switch 120. The limit switch 120 is connected to the control panel 24 via the limit switch connector 114. Thus, the control panel 24 can acquire information from the limit switch 120 via the limit switch connector 114 concerning the position of the compression member 16.

The remote status unit 112 is connected to the control panel 24 using the electrical connection 122. The electrical connection 122 provides power to the remote status unit 112 and provides information with respect to the position of the compression member 16 based upon the engagement of the limit switch 120.

FIG. 3 illustrates the remote status unit 112 being connected to the hydraulic line 30 by the pressure connector 116. Thus, as the hydraulic power pack 22 provides hydraulic power/force through the hydraulic line 30 to drive the compression member 16, the remote status unit 112 can acquire information about the magnitude of the pressure through the pressure connector 116. Therefore, the remote status unit 112 can acquire information with respect to the position of the compression member 16 from the control panel 24 via the electrical connection 122 and acquires information about the hydraulic drive pressure supplied to the compression member 16 via the pressure connector 116.

The packing system 14 illustrated in FIG. 3 may or may not be fitted with a limit switch 120. However, if the packing system 14 does not have the limit switch 120 prior to being adapted for the automated trash management system of the present invention, the packing system 14 can be retrofitted to have a limit switch 120. An alternative embodiment for practicing the present invention without the use of or the requirement of a limit switch is discussed below.

FIG. 4 is a block diagram illustrating the automated trash management system of the present invention for use with a compactor/container unit having a limit switch 120. A pressure sensor 124 provides information to an analog/digital (A/D) converter-scaler 126 which in turn provides the pressure information to a data smoothing/cycle counter 130. The limit switch 120 provides information to a limit switch modulator 128. The limit switch modulator 128 provides that there are no extraneous signals due to the bouncing of the limit switch contacts or some other intrinsic characteristic of the limit switch. Also, the limit switch modulator 128 provides a mechanism by which extraneous readings from the limit switch 120 are avoided because of the lack of total engagement of the limit switch 120 by the compression member 16. The pack cycles indicated by the engagement by the limit switch 120 with the compression member 16 is supplied to the data smoother/counter 130. The data smoother/counter 130 smooths the data to remove extraneous readings. For example, an extraneous reading would be when the pressure is high and the container 10 is not full. The smoothed data and the pack cycles are provided to a telephone controller 130. The telephone controller 130 provides the pressure data and the cycle data to the central unit 110 (not illustrated in FIG. 4) either via a telephone interface 136 or via a modem 134 and telephone interface 136.

Figure 5:
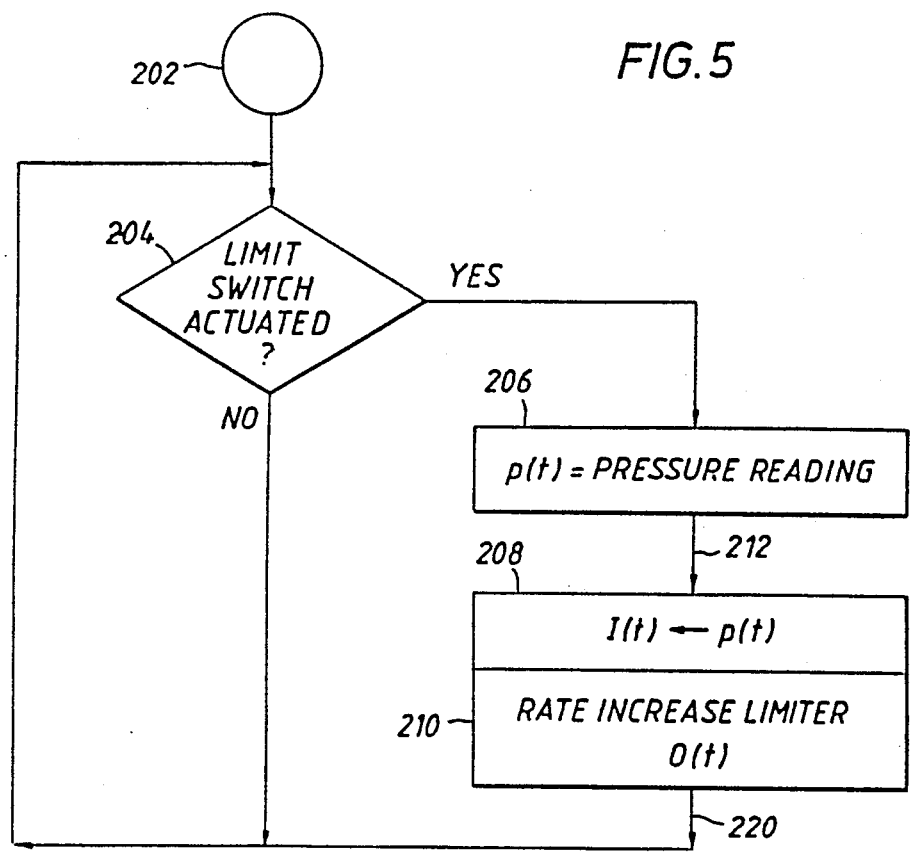
FIG. 5 is a flow diagram illustrating the evaluation procedure of the automated trash management system of the present invention for use with a compactor/container unit having a limit switch as illustrated in FIGS. 2, 3 and 4.

FIG. 5 is a flow diagram illustrating the evaluation procedure of the automated trash management system of the present invention used with a packing system 14 that either initially had a limit switch switch 120 or has been retrofitted with a limit switch 120. To smooth data associated with a compactor/container unit having a limit switch 120 requires that a simultaneous reading by made of the hydraulic drive pressure when the limit switch is activated. The flow diagram depicted in FIG. 5 uses the drive pressure and the limit switch information as input. As illustrated in FIG. 5, when the electrical signal from the limit switch 120 indicates that the switch has been activated, the hydraulic drive pressure reading is set to an initiating value, P(t). At the time P(t) is set, the pressure reading is input to a rate increase limiter device 210. The rate increase limiter device 210 simultaneously analyzes the consecutive pressure readings as the limit switch 120 is activated. The output from the reate increase limiter device 210 is O(t). The output pressure, O(t), is accumulated each time the limit switch 120 is activated.

An integral part of the present invention is the use of a rate increase limiter device 210 by which the input data is smoothed to minimize the effects of material tumbling in the container 10. Material tumbling in the container 10 causes up and down fluctuation in the pressure readings. If the fluctuations in the pressure readings are sufficiently high due to material binding and not adequately compacting, the container 10 may be misevaluated as approaching full and the container prematurely emptied. The rate of increase limiter device 210 receives the pressure reading in association with the pack cycles to provide a relative fullness reading as an output.

Figure 6:
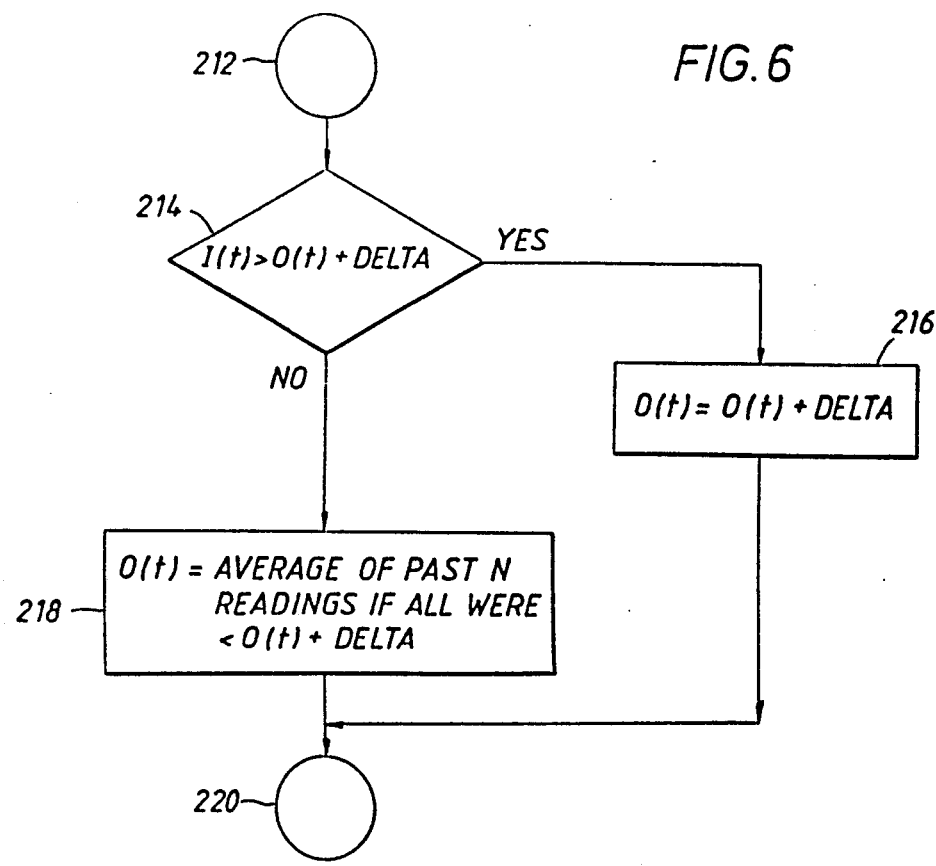
FIG. 6 is a flow diagram depicting the rate of increase limiter device illustrating the mechanism for limiting the rate of increase of pressure when utilizing the automated trash management system of the present invention.

FIG. 6 is a flow diagram depicting the rate of increase limiter device 210. FIG. 6 illustrates the mechanism for limiting the rate of increase of pressure to eliminate extraneous high pressure readings. The hydraulic drive pressure, when the compression member 16 is extended, is the input for the rate of increase limiter device 210 as indicated by the pressure input. When the rate of increase limiter device 210 is initially activated, the reported value is initialized with a value which indicates that no reading has yet been taken. When an initial reading is obtained, the reported value, $O(t)$, is initialized as a first reading. The first reading is represented by $O(t) = I(t)$. After the initial reading, a pressure comparison 214 is initiated. The pressure comparison 214 provides that the previously reported value, $O(t)$, plus a constant, DELTA, is compared with the present value, $I(t)$, i.e., $I(t) > O(t) + DELTA$.

If the value of $I(t)$ is greater than the sum of $O(t)$ plus DELTA, then the increment step 216 is initiated. The increment step 216 sets the value of $O(t)$ equal to $O(t)$ plus DELTA, i.e., $O(t) = O(t) + DELTA$. Thereafter, the value of $O(t)$ is provided to the output 220. Alternately, if the pressure comparison 214 is false, then the average of the past N readings are set to $O(t)$, if all the past N readings were less than $O(t)$ plus DELTA. If the averaging step 218 is initiated, the value of $O(t)$ is provided to the output 220.

The value of DELTA utilized in the rate of increase limiter device 210 illustrated in FIG. 6 is dependent on the particular container/compactor unit being used. DELTA is a constant representing the typical maximum change in pressure in one cycle of the packing system 14. DELTA can be computed for particular compactor/container unit by dividing the value representing the pressure associated with a full compactor/container unit by the typical minimum number of cycles to compact all the trash into a full container. For example, K equals the counts per pressure which is a characteristic of the A/D converter/scaler 126 and the pressure connector 116. Thus, DELTA equals the maximum increase in pressure for one cycle times a value K. If K equals one count per 20 psi and the maximum increase in pressure for one cycle is 30 psi, then, DELTA equals 20 psi times one count divided by 20 psi which equals 1.5. Since DELTA is an integer, the value of DELTA can be rounded either up or down to yield a value of 2 or 1, respectively.

The value of N utilized in the rate of increase limiter device 210 illustrated in FIG. 6 is a constant representing the number of consecutive low readings which must be obtained before lowering the reported value of the value received. The value of N is large enough to inhibit spurious low readings but is not sufficiently large to delay an appropriate low reading. Typically, the value of N is between five and ten. The averaging step 218 provides the mechanism by which the data is smoothed. Since the input value, $I(t)$, may cycle up and down, the general upward trend of $I(t)$ may not be obvious. Therefore, $O(t)$ is normally only allowed to increase and not decrease. Utilizing the averaging step 218 under the circumstances that several $I(t)$ values are contiguously lower than I(t), O(t) is changed to a lower value. In determining the proper value of N, a trade-off is required. In determining the value of N, if N is too small, O(t) will cycle up and down similar to I(t) and if N is too large, O(t) will drop too far after I(t) has dropped. Empirically, it appears that a value for N greater than five and less than fifteen is desirable when utilizing conventional compactor/container units.

Figure 7:
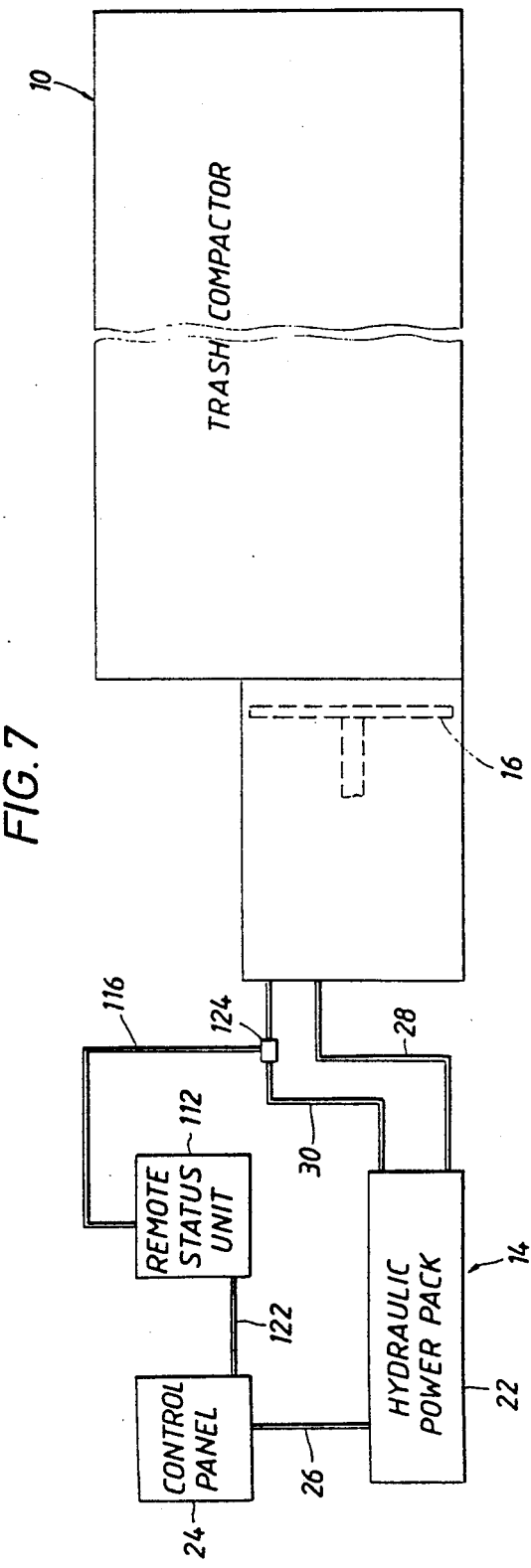
FIG. 7 depicts a schematic presentation of a single compactor/container unit not having a limit switch and adapted for use with the automated trash management system of the present invention.

FIG. 7 depicts a schematic representation of a single compactor/container unit not having a limit switch adapted for use with the automatic trash monitoring system of the present invention. Specifically, the packing system 14 has the primary component parts comprising the hydraulic power pack 22, the control panel 24, the electrical connection 26, and the hydraulic lines 28 and 30. The packing system 14 illustrated in FIG. 7 is modified by a second embodiment of the present invention. The second embodiment provides that only the pressure is monitored. Based upon the fluctuations, of the hydraulic drive pressure, the automated trash management system determines the fullness of the container 10. The remote status unit 112 is connected to the control panel 24 by the electrical connection 122. The electrical connection 122 provides power to the remote status unit 112. The hydraulic drive pressure associated with the hydraulic power pack 22 is extracted utilizing the pressure connection 116.

Switchless determination of container fullness using instantaneous pressure

FIG. 7 illustrates an embodiment of the present invention which does not utilize a limit switch. The embodiment of the present invention as illustrated in FIG. 7 determines an appropriate pressure which indicates that the container 10 is approaching full. The pressure used to anticipate the fullness of the container 10 is determined by constantly monitoring the hydraulic drive pressure as a function of time. The hydraulic drive pressure is evaluated for the proper features which determine when the compression member 16 is positioned to provide maximum trash compaction. The remote status unit 112, utilizing boundary limits placed on the rate of change of the hydraulic drive pressure, extracts a pressure reading which represents maximum trash compaction. A plurality of the pressure readings are used to determine the fullness of the container 10.

Figure 8:
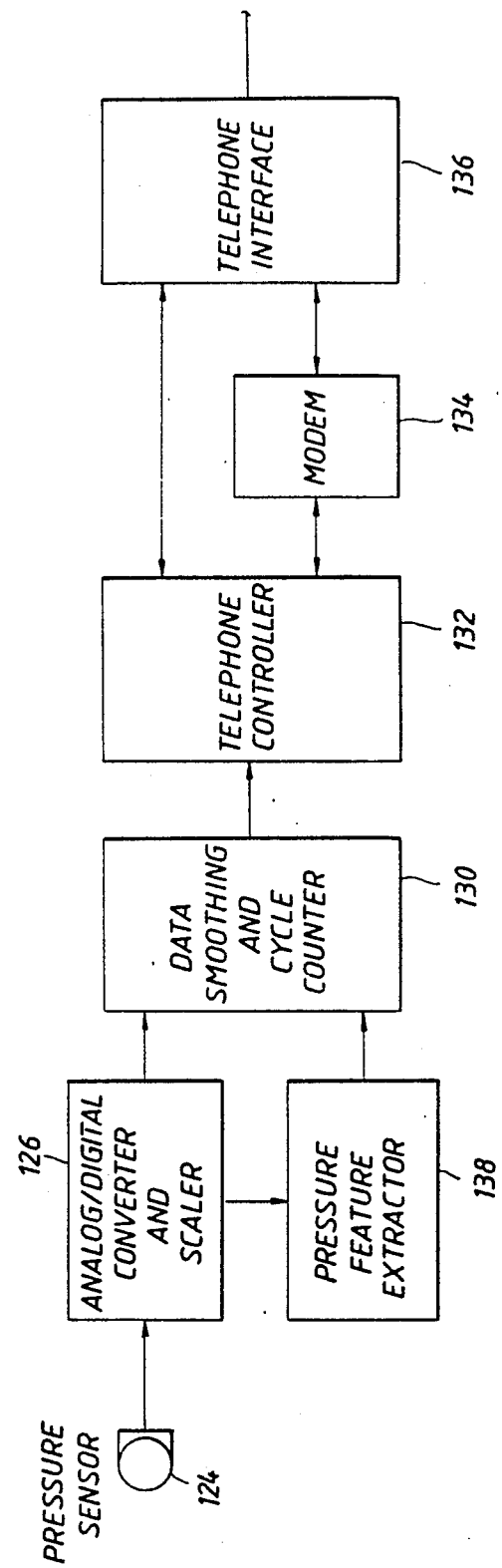
FIG. 8 is a block diagram illustrating the automated trash management system of the present invention for use with a compactor/container unit not having a limit switch.

FIG. 8 is a block diagram illustrating the embodiment of the present invention where the compactor/container unit does not have and is not retrofitted to have a limit switch. A pressure sensor 124 acquires the hydraulic drive pressure. The hydraulic drive pressure is provided to the A/D converter-scaler 126. The pressure from the A/D converter-scaler 126 is monitored by a pressure extractor 138 as well as by the data smoothing-/counter 130. The appropriate characteristics of the pressure are monitored and evaluated for determining that the compression member 16 is fully extended and compressing the trash in the container 10. The pressure extractor 138 provides a pressure reading to the data smoothing/counter 130. Thereafter, the data is transferred as previously discussed and illustrated in FIG. 4.

Figure 9:
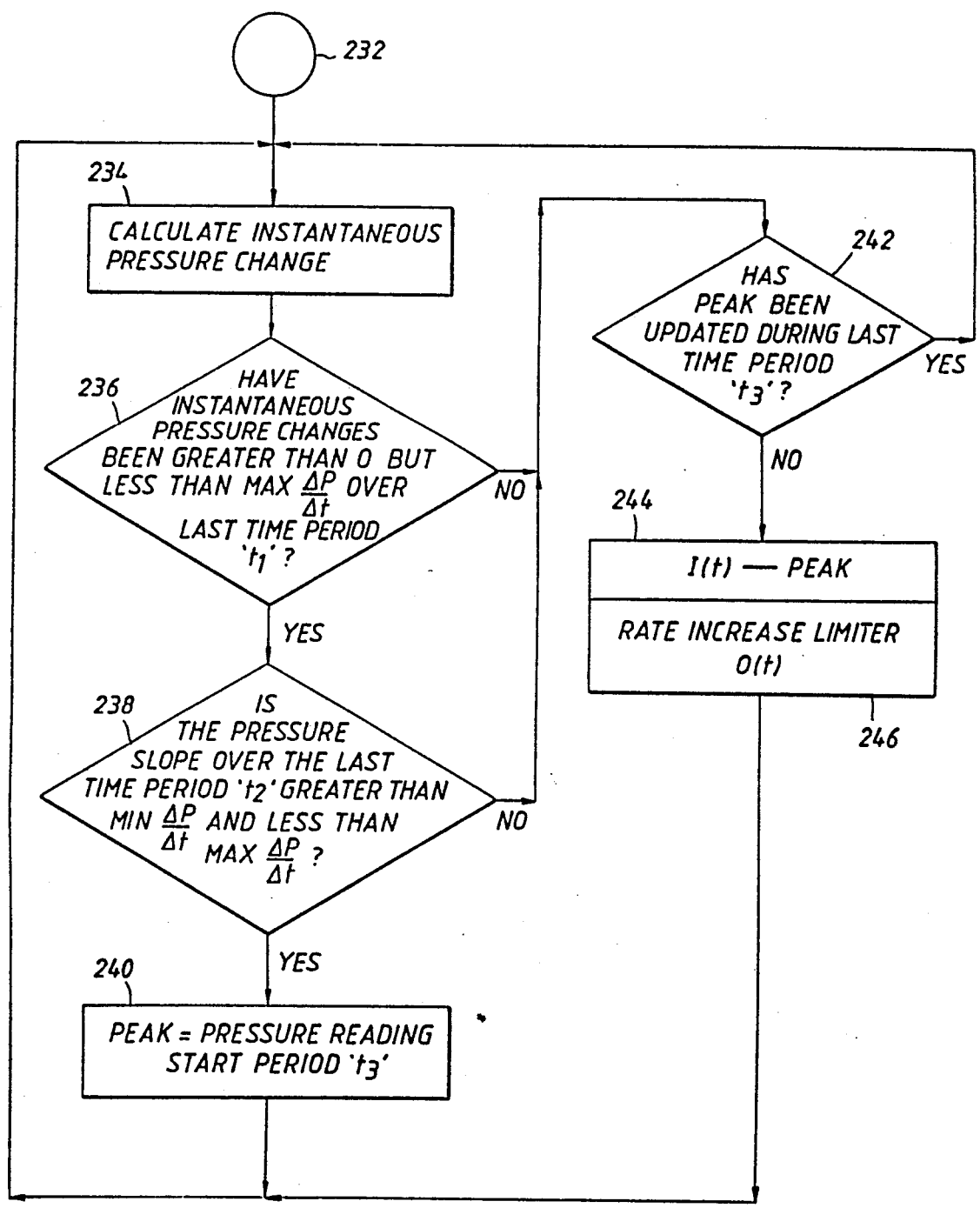
FIG. 9 is a flow diagram illustrating the evaluation procedure of the automated trash management system of the present invention for use with a compactor/container unit not having a limit switch as illustrated in FIGS. 7 and 8.

FIG. 9 is a flow diagram illustrating the evaluation procedure of the automated trash management system of the present invention for use with a compactor/container unit not having a limit switch. The pressure extractor device 138 utilizes the inherent hydraulic drive pressure present in conventional trash compactor/container units. Generally, any step changes and/or impulses in the hydraulic drive pressure are associated with either hydraulic switching or when the compression member 16 is fully extended. When a compression member cycle includes no ramp or monotonically increasing features, i.e., only step changes or impulses, the container 10 typically does not have enough trash in it to produce back pressure on the compression member when fully extended. When this phenomena is present while the compression member is in a compacting mode, the constant hydraulic drive pressure provides a base line pressure for a relatively empty container.

Alternately, the presence of constant pressures, of peaks associated with slowly increasing ramps or of exponentially increasing curves are an indication that a reading should be extracted and utilized as an indication of the position of the compression member 16. When a cycle includes a gradually increasing pressure feature, the peak of the gradually increasing pressure feature can be determined to be the back pressure on the compression member 16 when it is at a position of maximum compaction. By monitoring these pressure features, it is possible to determine (1) when the compression member 16 is fully extended, and (2) the pressure when the compression member is fully extended even without any direct measurement of the position of the compression member.

The pressure extractor 138 illustrated in FIG. 8 and depicted as a flow diagram in FIG. 9 is a device that finds the peak of a gradually increasing pressure function by comparing a current reading to previous readings to determine if the pressure is increasing monotonically. The difference in the consecutive hydraulic drive pressures are compared with a predetermined criteria to determine if the peak pressure has been reached. The criteria requires that the difference in the consecutive measurements of the hydraulic drive pressure is less than a maximum allowed slope and greater than a minimum allowed slope. The resultant peak pressure for the compression cycle is used as the input value for the rate of increase limiter device as previously discussed.

FIG. 9 is a flow diagram illustrating the pressure extractor device 138. The pressure extractor device 138 determines the peak non-extraneous pressure for a given compression cycle. The pressure input 232 to the pressure extractor device 138 is accepted as input from the A/D converter-scaler 126. In the pressure change mechanism 234, the instantaneous pressure change is recorded. The instantaneous pressure change is provided to the comparison of pressure changes mechanism 236. The instantaneous pressure changes are compared with a set of criteria. Typically, the criteria are that the pressure changes must be greater than zero but less than the maximum change in pressure per change in time over a specified time period, e.g., $t_1$. If the criteria are met, the pressure is transferred to the comparison of slope mechanism 238. The comparison of slope mechanism 238 compares the slope of the received pressure to a specified criterion. The criteria used by the slope mechanism 238 are that the slope of the changing pressure being monitored must be (1) greater than some minimum change in pressure per change in time and (2) less than some maximum change in pressure per change in time over a specified time period, e.g., $t_2$. If the second criterion is met then the pressure reading is the peak and a third specified time period, e.g., $t_3$, is started. If either of the two criteria as specified in the pressure change mechanism 236 or the slope mechanism 238 is not met, the instantaneous pressure change is transferred to the peak update mechanism 242. The peak update mechanism 242 determines if the peak has been updated during the last time period, $t_3$. If the instantaneous pressure change has been updated during the last time period, $t_3$, the information is recycled as input to the pressure change mechanism 234. If the peak has not been updated during the last time period, $t_3$, the peak is transferred to the assigned pressure peak mechanism 244 as value $I(t)$. The value $I(t)$ is provided to the rate increase limiter mechanism 246. The rate increase limiter mechanism 246 is the same device previously described and illustrated in FIG. 6.

The criteria used in the pressure change mechanism 236 and the slope mechanism 238 are empirical and based upon the particular compactor/container unit on which the automated trash management system is applied. The maximum change in pressure per change in time represents a comparison of compressible material by the particular compactor/container unit. For example, 1500 psi per second has been determined a reasonable value for the maximum change-in-pressure over change-in-time. The minimum value of change-in-pressure over change-in-time is also an empirical value. The minimum value represents a large enough increase in pressure over change-in-time to distinguish the compression of material from random pressure fluctuations when material is not being compressed. As illustrated in FIG. 9, $t_3$ is a constant representing approximately one-half ($\frac{1}{2}$) of the time necessary to complete a single cycle. For example, a compression cycle may take approximately 30 seconds. Therefore, $t_3$ would equal approximately 15 seconds. The value of $t_2$ is a constant representing approximately one-fourth ($\frac{1}{4}$) to one-fifth (1/5) of the value of $t_3$ which represents approximately one-eight ($\frac{1}{8}$) of a compression cycle. For example, if a compression cycle is approximately 30 seconds then the value of $t_2$ would be approximately 3 seconds. The value of $t_1$ is a constant representing approximately $\frac{1}{3}$ of the value of $t_2$ and representing approximately 1/24 of a complete compression cycle. Using the example given above, a value of $t_1$ would be approximately 1 second.

Figure 10:
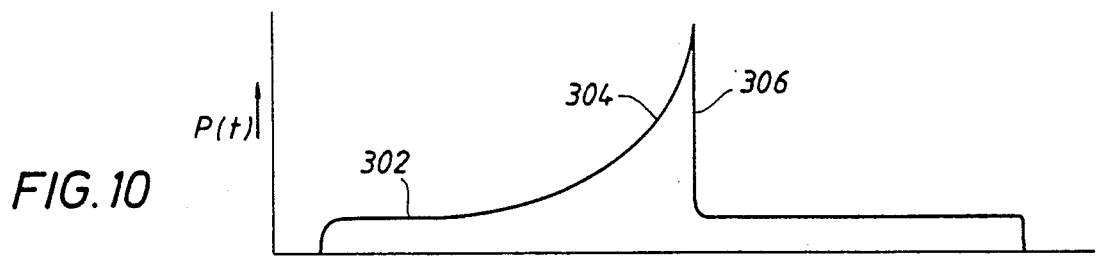
FIG. 10 depicts a graph illustrating the typical monotonic increase in pressure with respect to time and the typical step decrease in pressure with respect to time as a compression member compacts trash in a container and withdraws, respectively.

FIG. 10 is a graph illustrating a typical monotonically increasing pressure function with respect to time. Also, FIG. 10 illustrates the typical step decrease in pressure with respect to time as the compression member 6 compacts trash in a container and withdraws, respectively. The initial flat part of the curve 302 represents the compaction member 16 moving forward to compress the trash in the container 10. As the compaction member moves forward and the trash begins to provide resistance, the pressure increases with respect to time. The monotonic increase 304 illustrates the resistance provided by the trash when being compacted by the compaction member 16. When the compaction member 16 has fully extended and begins reversing direction, the step function decrease 306 is a result of a sharp decrease in pressure with respect to time. It is the monotonic increase 304 that is being evaluated by the pressure extractor 138 to determine when the compaction member 16 is fully extended against the trash.

Figure 11:
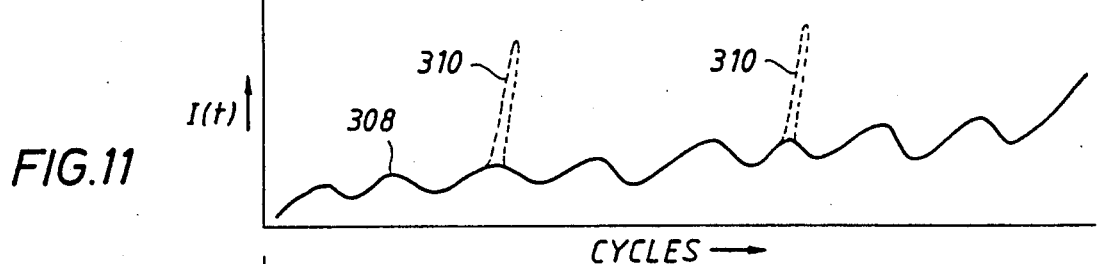
FIG. 11 is a graph illustrating the typical cyclic pressure associated with the compaction cycles as a container is progressively filled.

FIG. 11 is a graph illustrating the typical cyclically increasing pressure with respect to the compaction cycles or with respect to time as a container is progressively filled. It should be noted that the oscillating curve 308, although progressively increasing, has specific extraneous spikes 310 which may be interpreted as a full container or a container approaching fullness when indeed the container is at best partially full. It is the extraneous values represented by the larger-than-normal spikes 310 that are eliminated by the rate of increase limiter device 210 as previously described and illustrated in FIG. 6.

Figure 12:
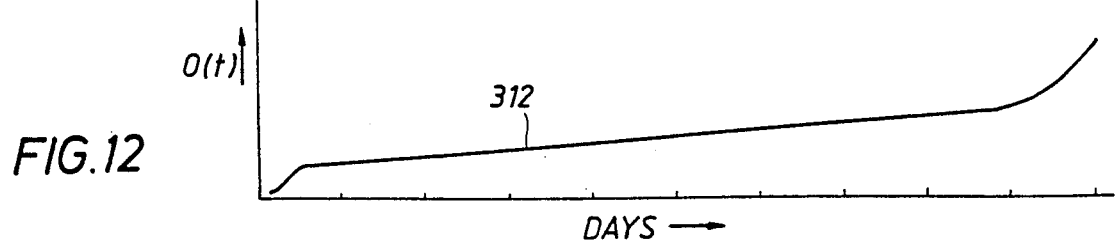
FIG. 12 depicts a graph of the resultant smooth curve achieved with the automated trash management system of the present invention illustrating the increase in pressure with respect to time as a container is progressively filled.

FIG. 12 depicts a graph of the resultant smooth curve 312 achieved with the automated trash management system of the present invention. FIG. 12 illustrates the increase in pressure with respect to time as a container is progressively filled. The progressively increasing value of pressure illustrated in FIG. 12 is free from the extraneous increases and decreases as exhibited in the raw input data illustrated in FIG. 11.

Alternative remote determination of container fullness using work determination

Figure 13:
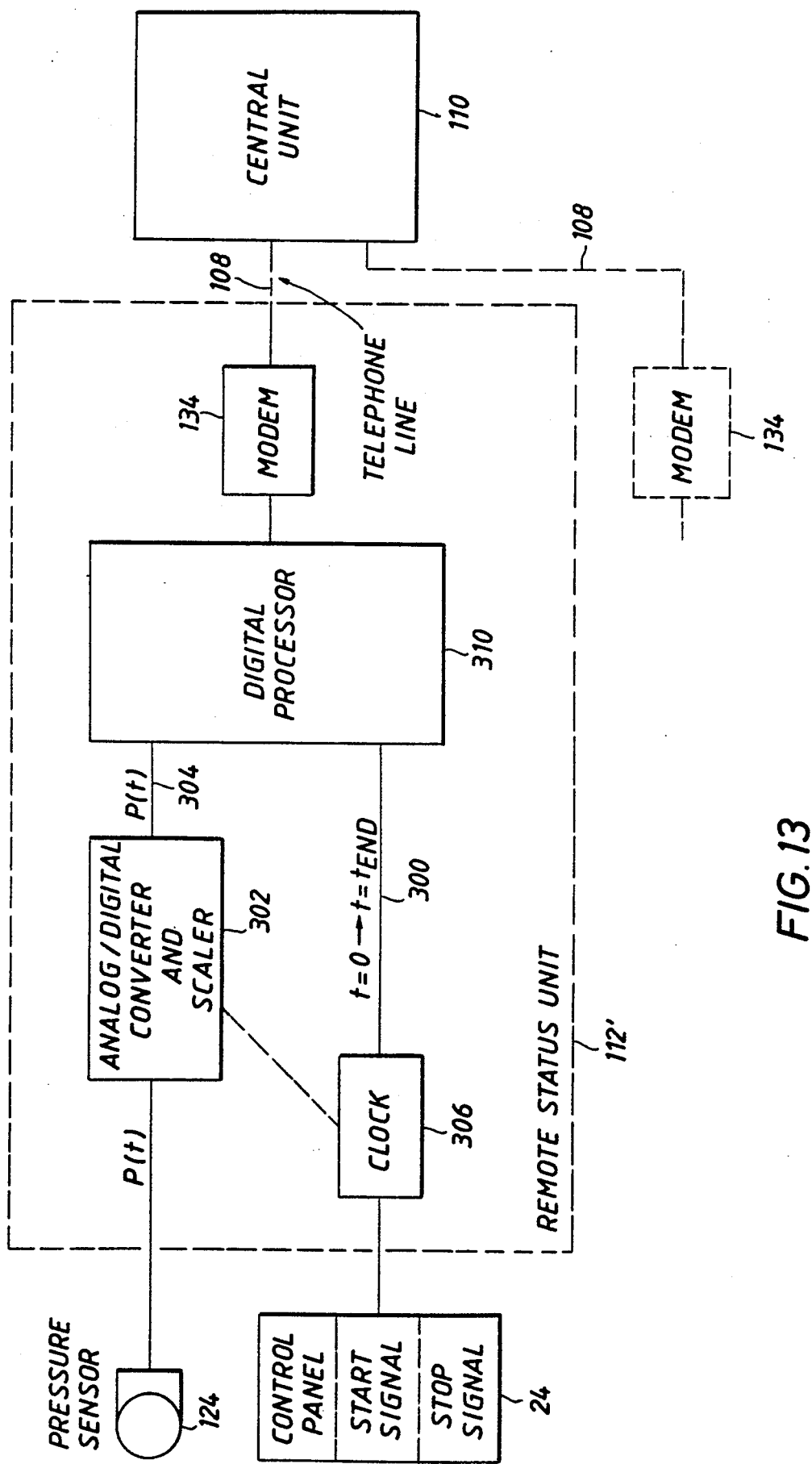
FIG. 13 is a schematic diagram of the system in which instantaneous pressure of the hydraulic fluid applied to the compression member of a compactor is combined with start and stop signals for the compression stroke to determine the amount of work expended during each compaction stroke and the total amount of such work expended after the container was last emptied.
Figure 14:
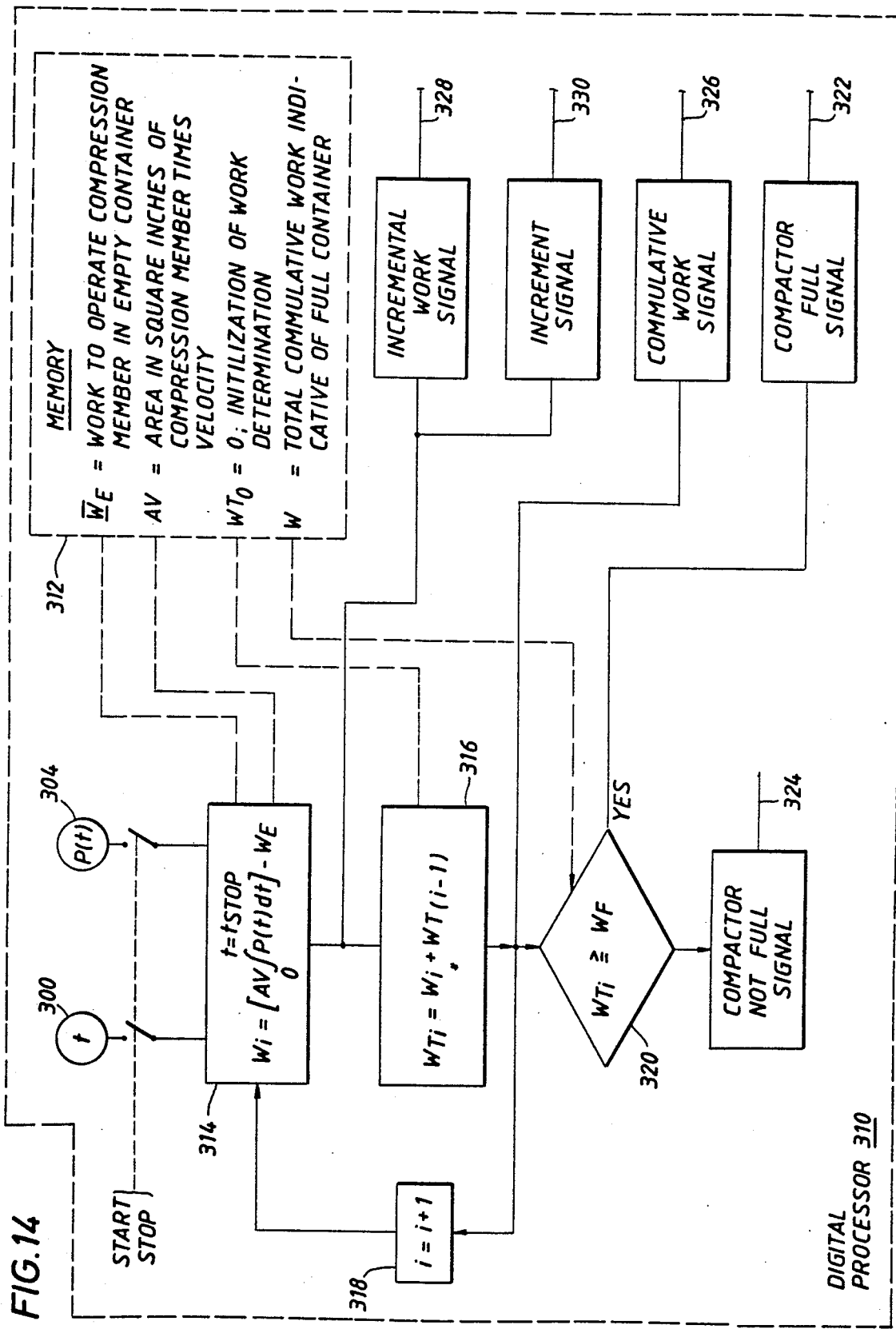
FIG. 14 is a flow diagram of determinations made in the digital processor associated with the remote sensor unit to determine whether or not its associated container is full.

FIGS. 13 and 14 illustrate an alternative remote sensing unit and system for remotely determining the extent of fullness of any one of a plurality of trash containers as shown in the schematic of the system of FIG. 1. The same pressure sensor 124 (see FIG. 3) may be used to determine the work done to fill the compactor/container. The total amount of work done by the compactor over a plurality of compaction cycles is a measure of the extent of fullness of the container.

FIG. 13 illustrates that the pressure sensor 124 produces a pressure signal $p(t)$ which is converted to digital form by A/D converter 302 and applied to digital processor 310. The control panel 24 of the compactor includes electrical circuits by which start and stop signals are applied to clock 306 of remote status unit 112'. The clock produces a time signal on lead 300 which is also applied to digital processor 310.

FIG. 14 illustrates the processing steps and data stored in the memory of digital processor 310. Such processing steps operate on the basis that the definition of work is force times distance travelled. Pressure is force per unit area. The force applied to the trash under compression is pressure applied by the compression member times the surface area of the compression member which is a constant for each individual trash compactor. The distance travelled by the compression member during a compression stroke is related directly to the time required for the member to make its forward stroke, because in a hydraulic system, the hydraulic fluid is essentially incompressible. The electric motor of the hydraulic power pack 22 (FIG. 3) runs a pump at constant speed. Consequently, the compression member travels essentially at constant velocity over the distance it must travel. As a result, the time for the compression stroke of the compression member is proportional to the distance that the compression member travels as it works to compress trash.

Integrating the pressure applied to the compression member as a function of time during the compression stroke provides a measure of the work done in compressing the trash plus the work done in moving the compression member forward. The work done in compressing the trash may be determined by subtracting the work done in moving the compression member forward into an empty (or near empty) container prior to any compression taking place. Summing this compression work value over each compression stroke after the container was last emptied provides a measure of the work expended in compressing the trash. The summed compression work therefore may be compared with a predetermined work full amount to determine the extent of fullness of the container. The predetermined "work full" amount is a constant for a given compactor/container size and for trash of a particular average consistency present at an individual location.

As shown in FIG. 14, certain constant data signals are stored in memory 312 of digital processor 310. The signal $W_E$ represents the predetermined work required to operate the compression member in an empty container. The signal AV represents the product of the area of the compression member and the velocity of the forward movement of the compression member during its compaction stroke. The data signal $W_{T0}=0$ represents the initialization of the work determined on the "0th" cycle, i.e., before the cycles $i=1$, $i=2$ ... begin. The data signal $W_F$ represents the total cumulative work indicative of a full container and is predetermined depending on the size and make of container and the kind of trash typically being deposited in the container.

The Digital Processor 310 includes a stored program to perform the process steps as illustrated in FIG. 11. In steps 314 of the digital processor 310, the pressure and time signals from leads 304 and 300, are controlled by start and stop signals from control panel 24. Such signals may be obtained from electrical leads in control panel 24 which turn on and off the motor included in Hydraulic Power Pack 22 (see FIGS. 3 and 7). The pressure signal is integrated as a function of time to generate a signal $W_i$ representative of the work expended in compressing the trash on the ith compaction cycle according to the relation, $$W_i = [AV \int_0^{t=t_{STOP}} P(t)dt] - W_E \quad (1)$$

Next, the step 316 is performed where the work performed on the ith compaction cycle is added to the work expended on the (i-1)th total work to obtain a new total work signal which cumulates the total work in compacting the trash from a time when the container was last emptied. The index i is incremented by one in step 318 and the processor is ready to accept new pressure and time signals when a new start signal is received which indicates that a new compaction cycle has begun.

In the meantime, the process step 320 of FIG. 14 indicates that the total work on the ith compaction cycle is compared with $W_F$, the predetermined work signal indicative of a full container. If $W_{Ti}=W_F$, a compactor full signal on lead 322 is applied. If $W_{Ti}<W_F$, a compactor not full signal is applied on lead 324. In addition, the cumulative work signal on lead 326 is applied. The incremental signal $W_i$ of the last compaction stroke may also be provided on lead 328. The cycle increment i may also be provided on lead 330. Each of the signals on leads 322, 324 or 326 and/or 328 are applied to modem 134 as indicated in FIG. 10 and may be transferred to a corresponding digital processor in central unit 110 via telephone line 108.

The step 320 indicated in FIG. 11 of comparing the total cumulative work at the ith compaction cycle with the signal $W_F$ to determine the extent of fullness of a container, may be done at the central unit by transmitting $W_{Ti}$ signals via lead 326 periodically to the central unit. It is convenient to interrogate the remote sensor units associated with trash containers, only once a day, usually late at night after a business day has concluded. Of course, such interrogation could be done more often than that if necessary.

The incremental work signal $W_i$ on lead 328 and the increment signal i on lead 330 may be transmitted to the central unit 110 via modem 134 and telephone line 108.

At the central unit $W_i$ can be compared with a predetermined data base of signals W as a function of i to determine (1) an indication of the fullness of the container or (2) an indication as to whether or not the compactor is functioning properly.

Alternative remote determination of container fullness by measuring current

Figure 15:
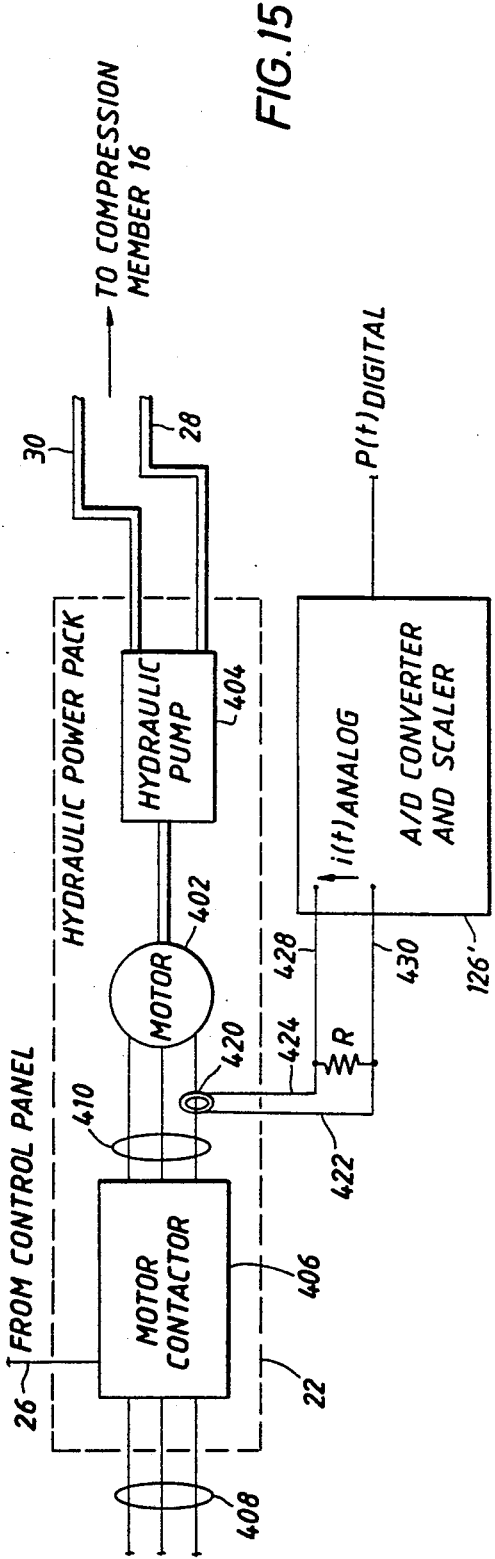
FIGS. 15 and 16 illustrate the invention in which current applied to the motor of the hydraulic power pack is sensed to produce a current signal as a substitute for measuring instantaneous pressures to the compression member and may be used as a substitute for pressure in any of the embodiments of the invention.

Rather than measuring instantaneous pressure directly, as illustrated in FIGS. 3 and 4 (where container fullness is determined using instantaneous pressure signals and a limit switch signal) or as illustrated in FIGS. 7 and 8 (where container fullness is determined using only instantaneous pressure signals), or as illustrated in FIGS. 13 and 14 (where container fullness is determined using only instantaneous pressure signals in combination with start and stop signals) a signal proportional to instantaneous pressure can be generated as illustrated in FIG. 15 by sensing the current applied to the electric motor 402 of hydraulic power pack 22. The power pack 22 includes a motor contactor 406 which allows current to flow in output power leads 410 from utility power lines 408 when a control signal on lead 26 from control panel 24 is present. Motor 402 drives hydraulic power 404 which applies pressurized fluid to compression member 16 via source and return hydraulic lines 28, 30.

A doughnut shaped transformer 420 is placed about one of the lines 410. Leads 422 and 424 connected to output leads of transformer 420 have a resistor 12 connected between them, such that when current flows in the lines 410, a responsive current is generated in transformer 420 causing a current to flow in leads 424, 422 and resistor R. Consequently, a signal proportional to current i(t) is developed across resistor R and is applied to A/D converter and scaler 126' via input leads 428, 430. The A/D converter and scaler 126' is similar to the A/D converter and scaler devices of FIGS. 4 and 8, but differs to that extent that a current signal is applied to the former, a pressure signal to the latter. The A/D converter and scaler 126' scales the current signal i(t) to be a direct indication of pressure.

The signal p(t) from A/D converter and scaler 126' may be applied to the smoothing and cycle counter 130 of FIG. 4 where limit switch signals are also applied and used in combination with the pressure signal to produce a data base of pressure signals as determined by the methods described in FIGS. 5 and 6. The signal p(t) from A/D converter and scaler 126' may also be applied to the pressure feature extractor 138 and data smoothing and cycle counter 130 of FIG. 8 to produce a data base of pressure signals as determined by the methods described in FIG. 9. The signal p(t) from A/D converter and scaler 126' may also be applied as in FIG. 13 to digital processor 310 where cumulative work signals are generated as described in FIG. 14.

Figure 16:
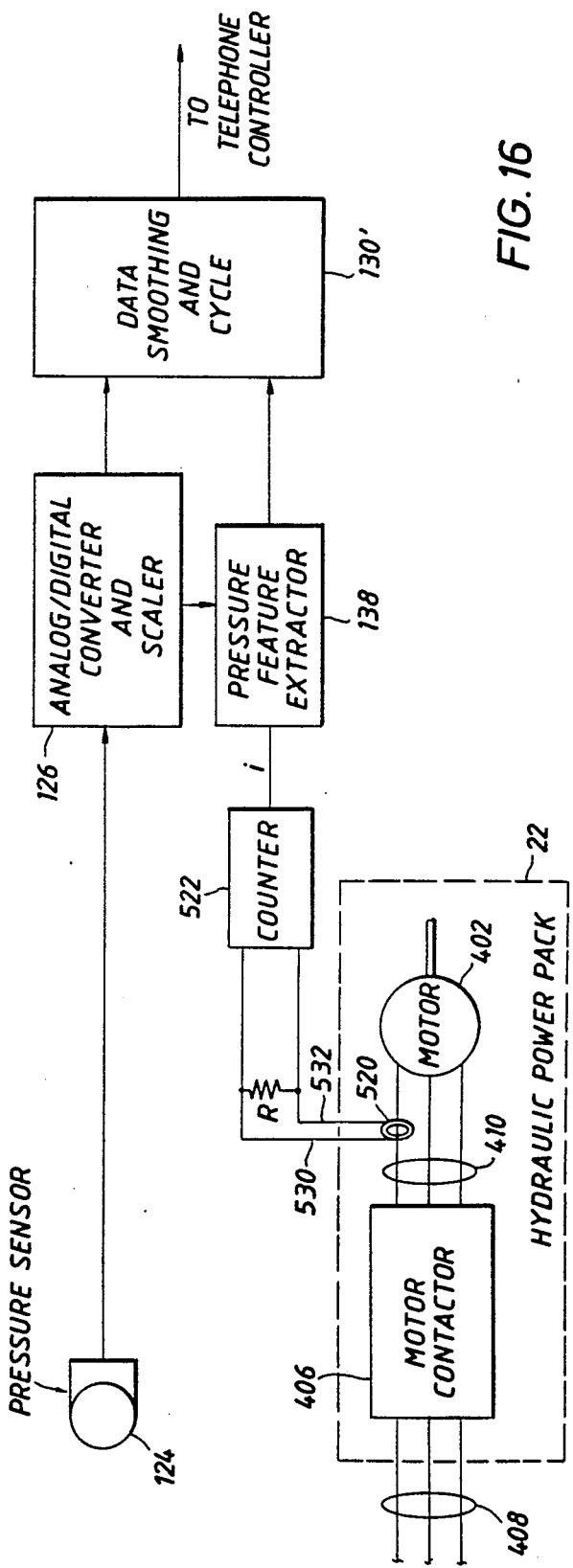

Alternative remote determination of container fullness by measuring pressure (or by measuring current proportional to pressure) in combination with contactor coil signals As illustrated in FIG. 16, the remote sensing unit of FIG. 8 may be modified by providing a signal representative of the number of counts i of compression strokes. Such counts may be obtained from motor contactor 406 by providing a transformer 520 about one of the power leads 410 to motor. A counter 52 responds to the voltage v developed across resistor R connected across transformer leads 530, 532. The count i is applied to pressure feature extractor 138 and is used directly rather than deriving it from purely pressure data as illustrated in FIG. 8. Such count data may also be used in the embodiment shown in FIG. 14 where cycle count data is called for.

Figure 17:
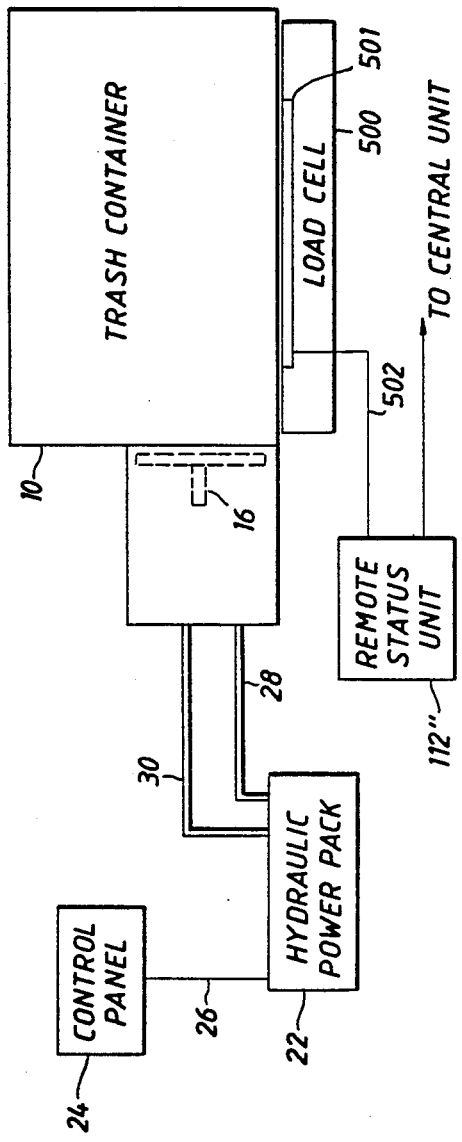
FIGS. 17 and 18 illustrate the invention in which the weight of a container is remotely sensed for determining the extent of fullness of the container.
Figure 18:
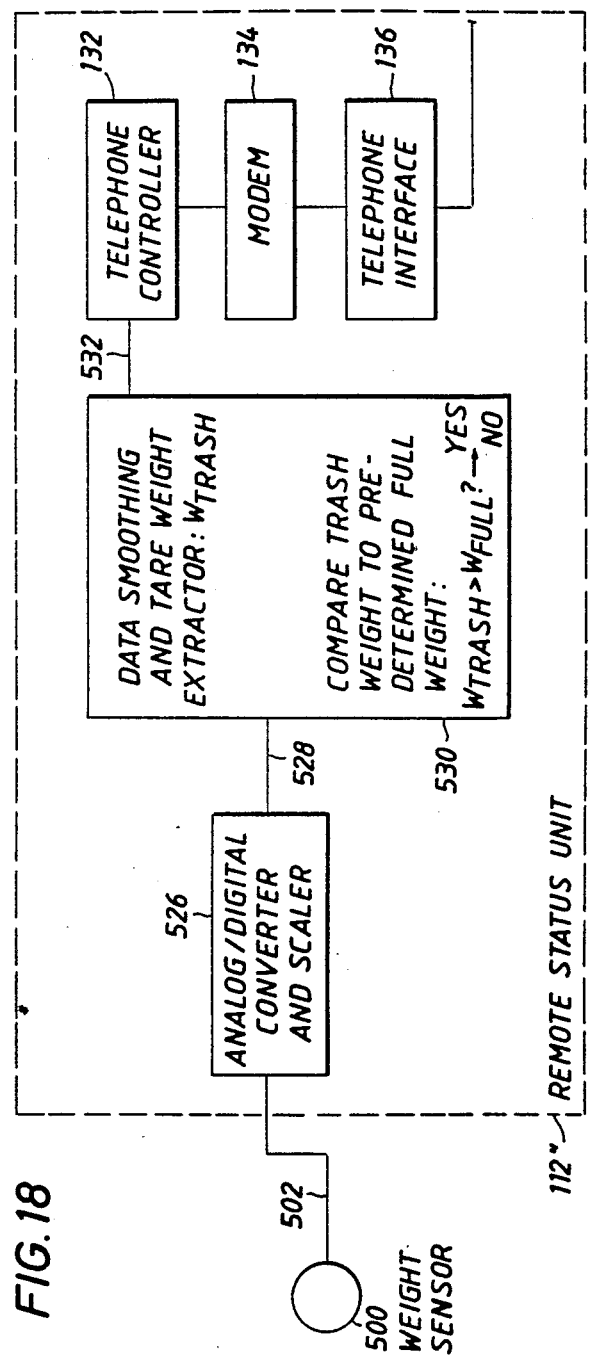

Alternative remote determination of container fullness by measuring container weight FIGS. 17 and 18 illustrate an alternative system for remotely sensing the fullness of a trash compactor or simply a trash container 10. As illustrated in FIG. 17, a compacting member 16 may be associated with container 10, or it may be absent. In other words, the control panel 24, hydraulic power pack 22, and compression member 16 may or may not be in the system. The control panel 24, hydraulic power pack and compression member 16 do not provide a signal input into remote status unit 112".

As illustrated in FIG. 17, a load cell or mounting plate 500 is provided beneath the trash container 10. A strain gauge 501 disposed on load cell 501 is electrically connected to remote status unit 112" via lead 502. It provides a signal to remote status unit proportional to the weight of container 10 and trash in the container.

FIG. 18 illustrates the elements of the system of the remote status unit 112" of FIG. 17. Analog to digital converter and scaler 526 converts the weight signal from lead 502, converts it to a digital signal on lead 528 and scales it according to the signal levels of the unit. The data smoothing and tare weight extractor unit 530 receives the digital signal on lead 528 and smooths it to eliminate spikes and extreme variations in the signal. It also subtracts a predetermined tare weight of the container. The tare weight is the weight of the container when empty.

Consequently, the unit 530 which is preferably a digital processor, produces a signal on lead 532 representative of the weight of the container. Such signal may be compared, either at the remote status unit, or at the central unit, with a predetermined weight value indicative of a full container. A determination of the extent of fullness can then be made.

The weight signal, or a degree of fullness signal determined from it may be remotely sensed by transmitting it to the central unit via telephone controller 132, modem 134 and telephone interface 136. The telephone controller 132 controls modem 134, telephone interface 136 and processes incoming and outgoing messages. Modem 134 is a standard modulator/demodulator circuit which converts serial digital signals to audio tones for transmission over a telephone dial network. Telephone interface 136 is a standard unit to provide circuit protection and isolation for connection to the dial telephone network. The telephone controller 132, modem 134 and telephone interface 136 are the same units as described in other embodiments of this invention.

Additional advantages and modifications will readily occur to those skilled in the art. The invention in its broader aspects is therefore not limited to the specific details, representative apparatus, and the illustrative examples shown and described herein. Accordingly, departures may be made from the detail without departing from the spirit or scope of the disclosed general inventive concept.

What is claimed is:

1. A monitoring system for measuring the fullness of any one of a plurality of trash containers, each trash container in operative association with a packing system having a compression member for engaging and compacting the trash in said trash container, the monitoring system comprising,
 a plurality of remote status units, each status unit in association with a trash container, each status unit including means for continuously recording signals representative of hydraulic pressure during compaction strokes of said packing system,
 communications linkage means for transferring said stored signals on command from a central unit means from each of said remote status units to said central unit means, said central unit means for issuing commands to and for periodically receiving stored signals representative of hydraulic pressure from each of said remote status units, whereby said stored signals are useful in determining the fullness of each of said trash containers.

2. A monitoring system for measuring the fullness of any one of a plurality of trash containers, each trash container in operative association with a packing system having a compression member for engaging and compacting the trash in said trash container, the monitoring system comprising:
 (a) a plurality of remote status units, each in association with one of said trash containers each status unit comprising
  (1) sensing device means for continuously monitoring the instantaneous pressure provided by the packing system to the trash of its associated trash container,
  (2) means for generating from the pressures monitored by said sensing device a signal representative of the fullness of said trash container and storing said signals in said status unit,
 (b) a central unit at a central location for receiving signals indicative of the fullness of each trash container from each associated remote status unit, and for compiling a database of fullness signals for each of said trash container, and
 (c) a communication linkage for transferring the signals indicative of the fullness of each trash container from said plurality of remote status units to said central unit, whereby
 the fullness of each trash container can be determined at said central location of said central unit, and, from said central location, authorization to a hauler to empty said trash containers can be restricted to only those containers which are full thereby reducing the frequency of emptying said trash container.

3. A monitoring system for measuring the fullness of any one of a plurality of trash compactors, comprising
 remote status unit means associated with each one of the trash compactors for storing signals representative of an operating characteristic of the trash compactor during its compaction cycle,
 communications linkage means for transferring said signals from each of said remote status unit means to a central unit means,
 said central unit means for periodically receiving said stored signals from each of said remote status unit means and for compiling a database of said signals for each of said remote status unit means,
 whereby the fullness of each trash compactor can be determined from said database of said signals for each of said remote status unit means at the central location and authorization given to a hauler to empty only trash compactors which are full.

4. The system of claim 3 wherein said signals representative of an operating characteristic of each trash compactor are signals proportional to hydraulic pressure provided by the packing system of the trash compactor during the time a compression member of the packing system is compacting trash.

5. The system of claim 3 wherein said signals representative of an operating characteristic of each trash compactor include signals representative of the count of compacting cycles of said trash compactor.

6. A monitoring system for measuring the fullness of any one of a plurality of trash containers, each trash container in operative association with a packing system having a compression member for engaging and compacting the trash in the trash container, the monitoring system comprising,
 (a) a plurality of remote status units, each status unit in association with a trash container,
  each remote status unit including
   means for generating a pressure signal representative of hydraulic pressure applied to said compression member during a compaction stroke of its associated trash container, said pressure signal being a function of time beginning at the start of compaction of said cycle and ending at the end of compaction of said cycle;
   means for storing a first predetermined signal representative of the work required to operate said compression member in said container when empty during a compaction stroke, and a second predetermined signal representative of the area of said compression member against which said hydraulic pressure is applied,
   processing means responsive to said pressure signal and to said first and second predetermined signals for generating a compaction stroke work signal representative of the work expended by said compression member in compacting trash in said container during each compaction stroke, and for generating and storing a cumulative work signal representative of the sum of each compaction stroke work signal of compaction strokes of said container from a time which said container was last emptied,
 (b) a central unit at a central location for receiving signals indicative of the fullness of each trash container from each associated remote status unit, and
 (c) a communication linkage for transferring said cumulative work signal to said central unit, whereby the fullness of each trash container can be determined at said central location of said central unit by comparing said cumulative work signal to a predetermined total cumulative work signal which is indicative of a full container, and from said central location, authorization to a hauler to empty said trash container can be restricted to only those containers which are nearing fullness thereby reducing the frequency of emptying said trash container.

7. A monitoring system for measuring the fullness of any one of a plurality of trash containers, each trash container in operative association with a packing system having a compression member for engaging and compacting the trash in the trash container, the monitoring system comprising,
 (a) a plurality of remote status units, each status unit in association with a trash container,
  each remote status unit including
   means for generating a pressure signal representative of hydraulic pressure applied to said compression member during a compaction stroke of its associated trash container, said pressure signal being a function of time beginning at the start of compaction of said cycle and ending at the end of compaction of said cycle;
   means for storing a first predetermined signal representative of the work required to operate said compression member in said container during a compaction stroke, and a second predetermined signal representative of the area of said compression member against which said hydraulic pressure is applied, and a third predetermined signal representative of total cumulative work indicative of a full container;
   processing means responsive to said pressure signal and to said first, second and third predetermined signals for
    (1) generating a compaction stroke work signal representative of the work expended by said compression member in compacting trash in said container during each compaction stroke,
    (2) generating a cumulative work signal representative of the sum of each compaction stroke work signal of compaction strokes of said container from a time when said container was last emptied, and
    (3) comparing said cumulative work signal with said third predetermined signal to produce a compactor full signal if said cumulative work signal is greater than said predetermined signal,
 (b) a central unit at a central location for receiving said compactor full signal from each associated remote status unit, and
 (c) a communications linkage for transferring said compactor full signal to said central unit, whereby the fullness of each trash container is determined by the existence of a compactor full signal received from such trash containers, and from said single location, authorization to a hauler to empty said trash containers can be restricted to only those containers which are full thereby reducing the frequency of emptying said trash containers.

8. Apparatus for measuring the fullness of a trash container comprising,
 a load cell including a strain gauge placed under said trash container, said strain gauge producing a weight signal proportional to the weight of said trash container and the weight of trash in said container,
 means responsive to said weight signal for generating a trash weight signal proportional to the weight of said trash in said container, and
 means for transmitting said trash weight signal to a central unit, where a determination of the fullness of the trash container is made.

9. The apparatus of claim 8 further comprising means for comparing said weight signal proportional to the trash in the container with a predetermined signal proportional to the weight of trash of a full container.

10. A monitoring system for measuring the fullness of any one of a plurality of trash container, the monitoring system comprising,
 (a) a plurality of remote status units, each status unit in association with a trash container,
  each remote status unit including a load cell including a strain gauge placed under its associated trash container, said load cell including a strain gauge which produces a weight signal proportional to the weight of said trash container and the weight of trash in said container, and means responsive to said weight signal for generating a trash weight signal proportional to the weight of said trash in said container, (b) a central unit for receiving said trash weight signal from each associated remote status unit, and (c) a communications linkage for transferring said trash weight signal from said remote status units to said central unit, whereby the fullness of each trash container can be determined by said trash weight signal in comparison to a predetermined weight signal indicative of a full container, and from said central unit, authorization to a hauler to empty said trash container can be restricted to only those containers which are full thereby reducing the frequency of emptying said trash container.

* * * * *